United States Patent [19]
Fox et al.

[11] Patent Number: 5,662,100
[45] Date of Patent: Sep. 2, 1997

[54] EDUCTIVE PRESSURE REGULATOR

[75] Inventors: James E. J. Fox, Lockport; Dennis H. Sattelberg, North Tonawanda, both of N.Y.

[73] Assignee: Harsco Corporation, Wormleysburg, Pa.

[21] Appl. No.: 669,549

[22] PCT Filed: Jan. 11, 1996

[86] PCT No.: PCT/US96/00378

§ 371 Date: Jul. 12, 1996

§ 102(e) Date: Jul. 12, 1996

[87] PCT Pub. No.: WO96/19761

PCT Pub. Date: Jun. 27, 1996

[51] Int. Cl.$^6$ ............................. F16K 17/14; A62B 7/04
[52] U.S. Cl. ..................... 128/205.24; 128/204.26; 128/204.29; 128/200.22; 128/205.18; 137/505.28
[58] Field of Search ..................... 128/204.26, 205.15, 128/205.24, 204.24, 204.29, 204.23, 200.22, 207.12, 505.28, 505.35, 505.41, 205.18; 137/454.21, 454.6, 454.8, 505.4

[56] References Cited

U.S. PATENT DOCUMENTS

| | | | |
|---|---|---|---|
| 2,576,516 | 11/1951 | Jurs | 128/205.24 |
| 3,211,175 | 10/1965 | Replogle | 137/505.28 |
| 3,522,818 | 8/1970 | Suchy | 137/505.18 |
| 4,437,460 | 3/1984 | Glynn | 128/205.24 |
| 4,887,638 | 12/1989 | Hellquist et al. | 137/505.28 |
| 4,909,269 | 3/1990 | Pritchard et al. | 137/505.28 |
| 5,184,609 | 2/1993 | Hart | 128/205.24 |
| 5,411,053 | 5/1995 | Markham et al. | 137/505.28 |

Primary Examiner—Vincent Millin
Assistant Examiner—V. Srivastava
Attorney, Agent, or Firm—Phillips, Lytle, Hitchcock, Blaine & Huber

[57] ABSTRACT

An improved pressure regulator (60) is provided with an eductive flow to maintain the outlet pressure at increased flows through the regulator. The improved regulator broadly includes a body (61) provided with a bore. A valve seat (24) is movably mounted in the bore to provide a valve seat. A valve member (68) is mounted in the body bore for controlled movement toward and away from the seat to vary the area of a main orifice through which fluid is adapted to flow from an inlet to an outlet. The body has a sensing passage (73) communicating a portion (76) of the bore with the exit passage (65). The facing surfaces (74, 76) of the bore and valve member are so dimensioned and configured as to provide an elongated open-ended annular space (78) therebetween that extends along the guide passage from its communicative intersection with the exit passage to a point beyond which the sensing passage communicates with the guide passage. A projection (81) extends from one of the facing surfaces toward the other of the facing surfaces at a location between the open end of the guide passage and the sensing passage to provide a secondary flow restriction. The magnitude of the outlet pressure at increased flows from the inlet to the outlet is better maintained.

11 Claims, 3 Drawing Sheets

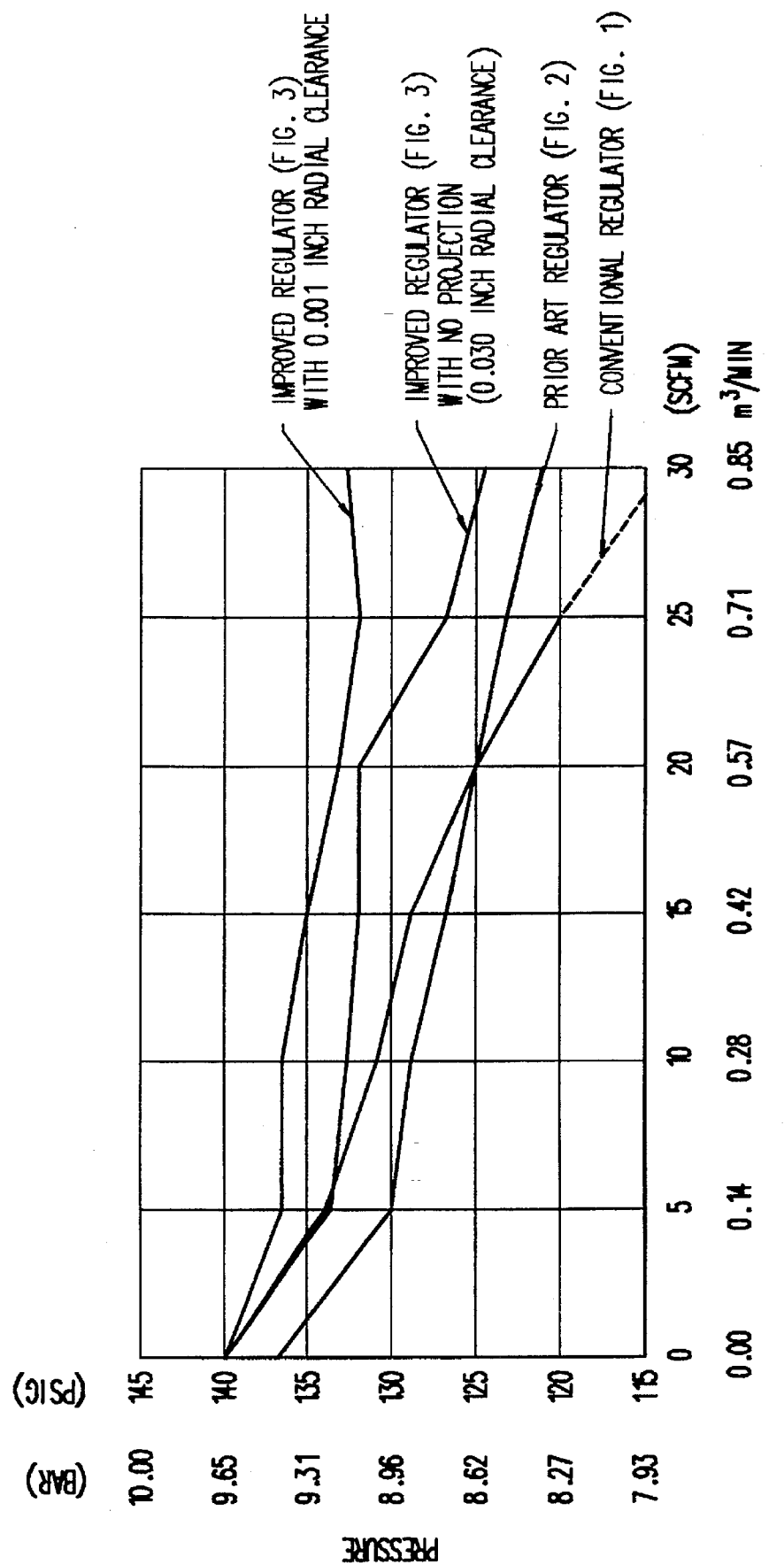

EDUCTIVE PRESSURE REGULATOR

FIELD OF THE INVENTION

The present invention relates generally to the field of pressure regulators, such as commonly used with self-contained breathing apparatus and the like, and, more particularly, to an improved pressure regulator that exhibits increased dynamic responsiveness and that is adapted to better maintain the outlet pressure delivered to a serviced device at increased flows through the regulator.

BACKGROUND ART

A self-contained underwater breathing apparatus typically has a gas storage vessel with a first-stage regulator mounted thereon. The function of this regulator is to reduce the tank pressure to some lower value. A hose communicates the first-stage regulator fluid outlet with the inlet of a second-stage regulator, typically located at or near the diver's mouth. This is usually a demand-type regulator that compensates for the diver's depth, and that admits air on a demanded basis. Examples of first-stage regulators are representatively shown and described in U.S. Pat. Nos. 3,211,175 and 3,522,818, the aggregate disclosures of which are hereby incorporated reference.

One problem with such prior art or conventional first-stage regulators is that the pressure of fluid delivered at the end of the hose to the second-stage inlet tends to fall off sharply at increased flows through the regulator. To this end, personnel employed by the assignee of the present invention have attempted to devise a device that would better maintain the pressure at the distal end of the hose at increased flows through the regulator. One such implementation is shown in abandoned U.S. patent application Ser. No. 07/124,922, filed Nov. 24, 1987, and entitled "Pressure Regulator". An Assignment of this invention and application in favor of Harsco Corporation was recorded in the Patent and Trademark Office on Nov. 24, 1988 at Reel 4814, Frames 442–443. The subject matter disclosed and claimed in this application was invented by James E. J. Fox, who was then, and is now, an employee of Harsco Corporation, and is a co-inventor of the subject matter disclosed and claimed in this application. It is believed that the regulator shown in this application was sold more than one year prior to the filing of this application, and therefore qualifies as prior art under 35 U.S.C. §102(b). As shown in that abandoned application, a downstream sensing passageway was provided between the outlet conduit and the valve actuation chamber. However, the size and placement of that sensing passageway did not allow the body of the regulator to be optimally reduced to a practical minimum. Nor did it increase the dynamic responsiveness of the regulator to the extent now provided by the present Applicants' further improvement.

In any event, the problem has continued, and has received the present Applicants' consideration. The present Applicants have devised a further improved arrangement that appears to further increase the dynamic responsiveness of the regulator to changes in the demanded flows, and to better maintain the outlet pressure at the distal end of the hose at increased flows through the regulator.

It would be generally desirable to provide an improved pressure regulator that has the capability of restraining the delivered outlet pressure at the end of the hose from falling off sharply and substantially at increased demanded flows through the first-stage regulator.

DISCLOSURE OF THE INVENTION

With parenthetical reference to the corresponding parts, portions or surfaces of the disclosed embodiment, merely for purposes of illustration and not by way of limitation, the present invention broadly provides an improved pressure regulator, particularly suited for use with self-contained breathing apparatus and the like, which has an eductive flow to better maintain the outlet pressure at increased flows of fluid through the valve.

The improved regulator (10) broadly includes: a body (62) provided with a bore; seat means (12) forming a seat (24) at an intermediate portion of the bore, the seat subdividing the bore into an entrance passage and a guide passage, the entrance passage (communicating with an inlet; the body being provided with an exit passage (65) communicating the end of the guide passage that is arranged adjacent the seat with an outlet; a valve member (68) mounted in the guide passage for controlled movement toward and away from the seat to selectively vary the area of a main orifice through which fluid is adapted to flow from the inlet to the outlet, the valve member having an outwardly-facing surface (74) arranged in spaced relation to an inwardly-facing surface (76) of the guide passage; the body also having a sensing passage (73) communicating the guide passage with the exit passage; the guide passage and valve member facing surfaces being so dimensioned and configured as to provide an elongated open-ended annular space (78) therebetween that extends along the guide passage from its communicative intersection with the exit passage to a point beyond the place at which the sensing passage communicates with the guide passage; and a projection (81) extending from one of the facing surfaces toward the other of the facing surfaces at a location between the open end of the guide passage and the sensing passage to provide a flow restriction; whereby the magnitude of the outlet pressure at increased fluid flows from the inlet to the outlet will be substantially maintained.

Accordingly, the general object of this invention is to provide an improved pressure regulator that tends to better maintain the outlet or delivered pressure it increased flows through the regulator.

Another object is to provide an improved pressure regulator wherein the outlet or delivered pressure at increased flows does not fall off as sharply as in the prior art.

Another object is to provide an improved pressure regulator having an eductive flow to maintain the outlet or delivered pressures at increased flows through the regulator.

Still another object is to provide an improved pressure regulator which is more responsive to demand-flow conditions, and which offers the capability of being assembled in a more compact package.

These and other objects and advantages will become apparent from the foregoing and ongoing written specification, the drawings, and the appended claims.

BRIEF DESCRIPTION OF THE DRAWINGS

FIG. 5 is a plot of gauge pressure (ordinate), expressed in pounds per square inch ("PSIG") and atmospheres ("BAR") vs. flow (abscissa), expressed in standard cubic feet per minute ("SCFM") and cubic meters per minute ("m³/min"), and comparatively shows the end-of-hose pressures available using the various regulators as shown in FIGS. 1–3.

DESCRIPTION OF THE PREFERRED EMBODIMENT(s)

Figure 1:
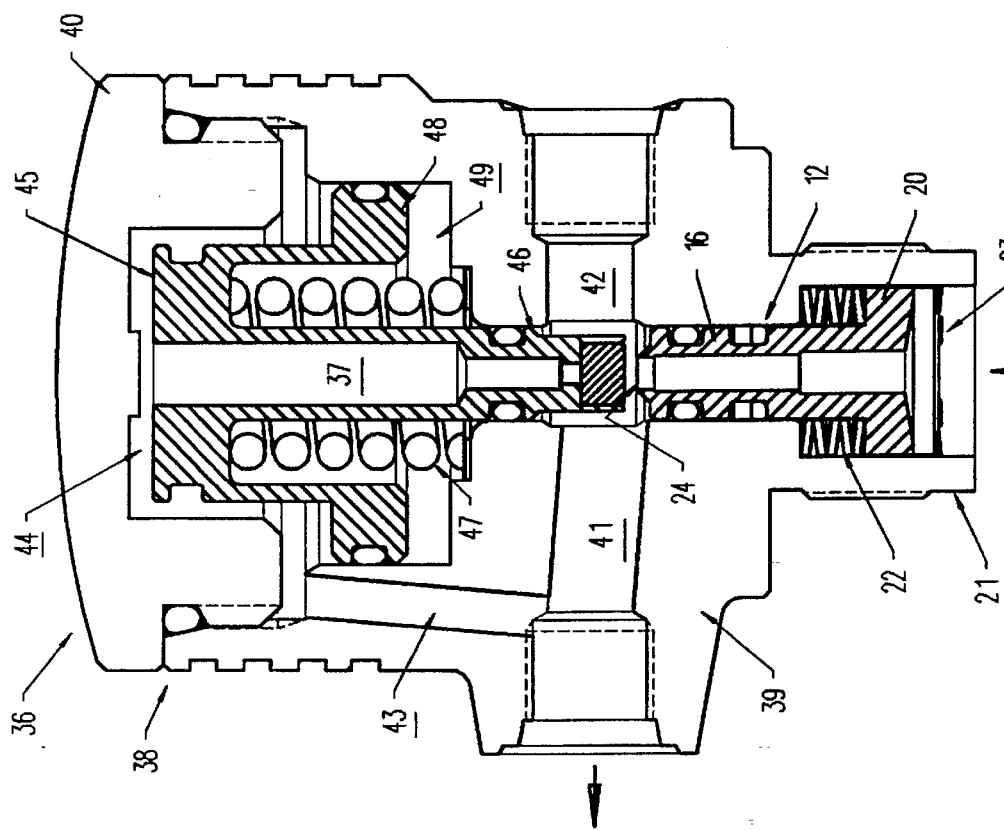
FIG. 1 is a fragmentary vertical sectional view of a conventional prior an pressure regulator, this view showing the outlines of the various parts and with only the valve member and the seat member being cross-hatched for clarity of illustration.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

First Prior Art Regulator (FIG. 1)

Referring now to the drawings, and, more particularly, to FIG. 1 thereof, a conventional prior art pressure regulator, generally indicated at 10 is shown as broadly including a two-piece body 11, a seat member 12, and a valve member 13. The assembled body includes a lower portion 14, and an upper inverted cup-shaped portion 15 threadedly engaged with lower portion 14 and defining a chamber therebetween. Body portion 14 is shown as having a vertically-elongated axial through-bore, and left and right branch passages 18, 19, respectively, communicating with the central portion of the through-bore and extending laterally outwardly therefrom.

Seat member 12 is shown as being a vertically-elongated specially-configured member having an upper narrowed portion 16 sealingly and slidably arranged within a lower portion of the body through-bore, and as having a lower radially-enlarged head portion 20 extending outwardly therefrom at its lower end. This head portion is shown as being slidably arranged in an integral coaxial collar 21 depending from body portion 14. A Belleville spring stack, collectively indicated at 22, acts between the body and the piston, and urges the seat member to move downwardly until it abuts a spider- or star-shaped stop 23 mounted in the collar. The seat member has a vertical through-bore that opens on to an annular seat 24 at its upper end. Collar 21 is externally threaded, and is adapted to be matingly received in a gas storage cylinder (not shown).

Valve member 13 is shown as being a vertically-elongated specially-configured member having a T-shaped cross-section. The valve member has a lower narrowed portion 25 sealingly and slidably engaged with the upper portion of the body through-bore. Valve member 13 also has an upper radially-enlarged piston head portion 26 mounted for sealed sliding movement within body portion 15. Piston 26 subdivides the body cavity into a lower chamber 27 and an upper chamber 28. The valve member is shown as having a stepped axial through-bore 29 which communicates upper chamber 28 with the portion of the body through-bore immediately above seat 24. The valve member carries a resilient cushion 30 at its lower end for movement toward and away from the seat.

Body passage 19 is adapted to be plugged and sealed in use. Thus, when mounted on a cylinder valve (not shown) or other gas storage device (not shown), gas is adapted to flow upwardly in the direction of the indicated arrows from the cylinder through the seat member, through the orifice defined by the spacing between cushion 30 and seat 24, and leftwardly through outlet passage 18 to the regulator outlet. A coil spring 31 acts between the body and the piston, and urges it to move upwardly relative to body portion 14. Chamber 27 is appropriately vented, and may be regarded as being at ambient pressure.

As flow is demanded through the outlet, the pressure in outlet passage 18 falls. Since this outlet passage communicates via valve member bore 29 with upper chamber 28, the pressure in chamber 28 will fall and the valve member will move upwardly away from the seat. This increases the area of the orifice, and allows additional flow through the regulator to satisfy the demand. However, it is believed that the operation of this valve member was not as fast as provided by the present Applicants' improvement.

FIG. 5 is a plot showing the outlet pressure measured at the end of a hose communicating with the outlet, as a function of flow. From this, it may be seen that, with the conventional regulator, the end-of-hose pressure fell off sharply with increased flows. The data in FIG. 5 is summarized herebelow:

TABLE 1

| Conventional Regulator (FIG. 1) | |
|---|---|
| Pressure | Flow |
| 140 PSIG [9.65 BAR] | 0 SCFM [0.00 m³/min] |
| 134 PSIG [9.24 BAR] | 5 SCFM [0.14 m³/min] |
| 131 PSIG [9.03 BAR] | 10 SCFM [0.28 m³/min] |
| 129 PSIG [8.89 BAR] | 15 SCFM [0.42 m³/min] |
| 125 PSIG [8.62 BAR] | 20 SCFM [0.57 m³/min] |
| 120 PSIG [8.27 BAR] | 25 SCFM [0.71 m³/min] |
| 111 PSIG [7.65 BAR] | 30 SCFM [0.85 m³/min] |

Figure 2:
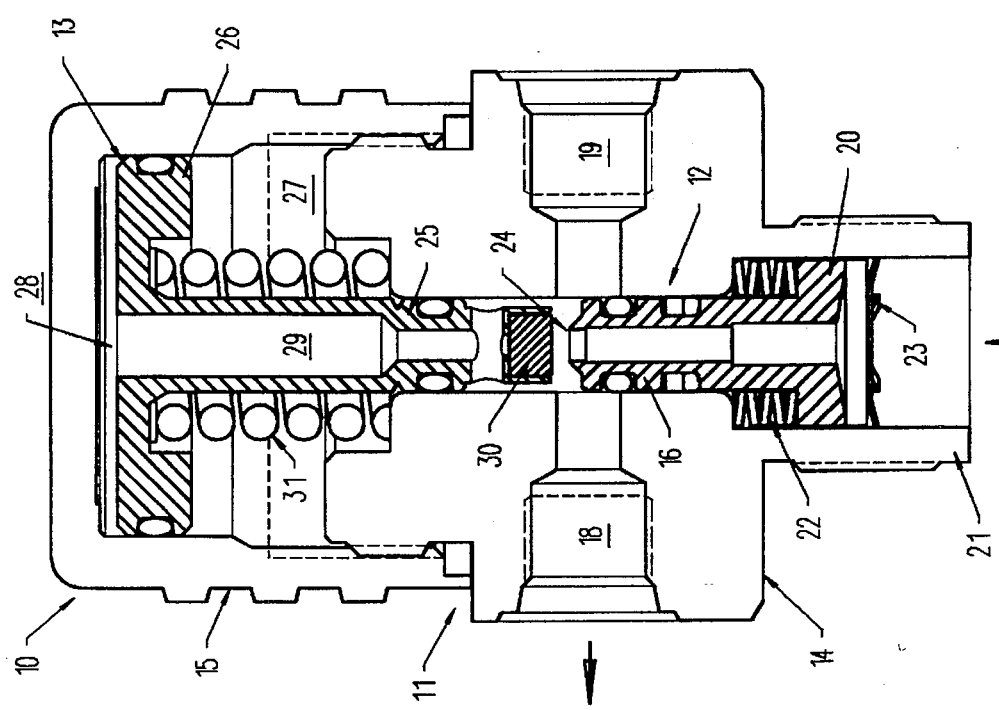
FIG. 2 is a fragmentary vertical sectional view of another earlier regulator, such as shown and described in abandoned U.S. patent application Ser. No. 07/124,922, this view showing the regulator as having a sensing passageway communicating the outlet passage with the valve member chamber, this view also showing the outlines of the various parts with only the valve member and the seat member being cross-hatched for clarity of illustration.

Second Prior Art Regulator (FIG. 2)

FIG. 2 is a view of an another prior art pressure regulator, such as shown and described in abandoned U.S. patent application Ser. No. 07/124,922. As noted above, while this application may have been abandoned, it is believed that regulators embodying this design were sold commercially more than one year prior to the filing date of this application. Hence, the design shown in this application is regarded as being prior art.

In any event, the device shown in FIG. 2 is another type of pressure regulator, generally indicated at 36, having a two-piece body 38. The assembled body is shown as having a lower part 39 and an upper inverted cup-shaped part 40 threadedly and sealingly mounted on the lower part and defining a chamber therebetween. The body lower part is shown as having a stepped vertical through-bore. Lateral passageways 41, 42 extend leftwardly and rightwardly, respectively, from an intermediate portion of body vertical through-bore. A sensing passageway 43 communicates the outlet passageway 41 with an upper chamber 44 defined above the valve member.

A seat member 12, substantially similar to the seat member previously described, is mounted for sealed sliding movement within the lower portion of the through-bore. This seat member has a generally tubular cylindrical portion 16 mounted for sealed sliding movement within the through-bore, and has a lowermost radially-enlarged piston portion 20 mounted for sliding movement within depending collar 21. A Belleville spring stack, generally indicated at 22, acts between the body and the piston portion, and urges the seat member to move downwardly against a spider-shaped stop 23. The seat member has a stepped vertical through-bore which opens on to a seat 24 at its upper end.

Pressure regulator 36 is shown as further including a valve member 45, having a lower cylindrical tubular portion 46 sealingly and slidably arranged within the upper portion of the body through-bore, and as having an upper specially-configured piston head 48 mounted for sealed sliding movement within the body chamber. Piston head 48 subdivides this chamber into a lower chamber 49 which is vented to ambient pressure, and an upper chamber 44 communicating with sensing passageway 43. A spring 47 acts between body part 39 and the piston head, and urges it to move upwardly.

As with the first embodiment, the form shown in FIG. 2 is adapted to be mounted on a cylinder valve or other pressure vessel (not shown) to regulate the upward flow of fluid from the inlet to the leftward outlet. Passage 42 is adapted to be plugged and sealed in use. As demand at the outlet increases, the pressure in the outlet passage 41 begins to fall. This decrease in pressure is transmitted via sensing passage 43 and valve member passage 37 to chamber 44. When the pressure in chamber 44 begins to decrease, spring 47 expands, and urges the valve member to move upwardly away from the seat. This increases the area of the uncovered orifice, and allows additional flow to satisfy the demand.

If the demand decreases, the pressure in the outlet will begin to build. This pressure increase will be transmitted to chamber 44 via sensing passage 43 and valve member passage 37. Hence, in this event, the piston will move downwardly, and the valve member will move toward the seat to restrict the main flow orifice.

FIG. 5 illustrates the performance characteristics of the regulator shown in FIG. 2. This data illustrates that, while the performance is substantially improved at increased flows over the regulator shown in FIG. 1, the pressure still decreases with increased outlet flow. The data shown in FIG. 5 is summarized herebelow:

TABLE 2

| Prior Art Regulator (FIG. 2) | |
|---|---|
| Pressure | Flow |
| 137 PSIG [9.45 BAR] | 0 SCFM [0.00 m³/min] |
| 130 PSIG [8.96 BAR] | 5 SCFM [0.14 m³/min] |
| 129 PSIG [8.89 BAR] | 10 SCFM [0.28 m³/min] |
| 127 PSIG [8.76 BAR] | 15 SCFM [0.42 m³/min] |
| 125 PSIG [8.62 BAR] | 20 SCFM [0.57 m³/min] |
| 123 PSIG [8.48 BAR] | 25 SCFM [0.71 m³/min] |
| 121 PSIG [8.34 BAR] | 30 SCFM [0.85 m³/min] |

Figure 4:
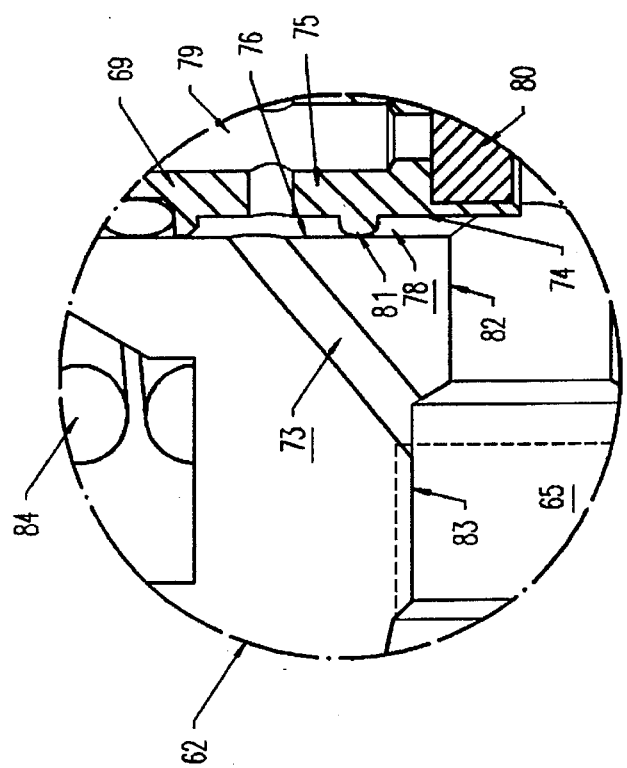
FIG. 4 is a fragmentary enlarged detail view of the structure within the indicated circle in FIG. 3.
Figure 3:
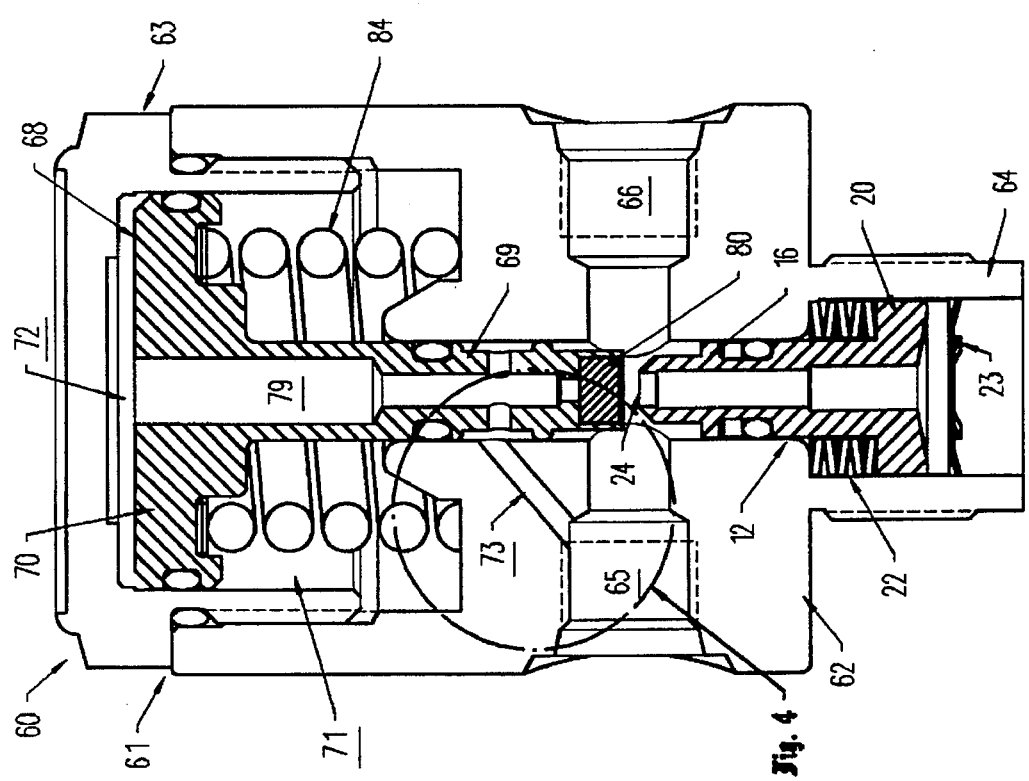
FIG. 3 is a fragmentary vertical sectional view of the presently-preferred form of the improved regulator, again with only the valve member and the seat member being cross-hatched for clarity of illustration, this view showing the valve member as being mounted for movement toward and away from the seat member, with a sensing passageway communicating an open-ended annular space between the valve member and the body with the outlet passageway to create an eductive flow fluid from the actuator chamber through the valve member.

Improved Regulator (FIGS. 3–4)

The presently-preferred form of the improved pressure regulator, according to the present invention, is indicated generally at 60 in FIG. 3. Pressure regulator 60 is also shown as having a two-part body 61. This body has a lower portion 62, and an upper inverted cup-shaped portion 63 arranged to threadedly and sealingly engage the lower portion 62. Body portion 62 has a central vertical through-bore that extends upwardly from a depending axial collar 64. Left and right passageways 65, 66, respectively, extend laterally outwardly from an intermediate portion of the vertical through-bore. Passage 66 is adapted to be plugged and sealed in use.

A seat member, again generally indicated at 12, has a tubular portion 16 sealingly and slidably mounted within the lower portion of the body through-bore, and has a radially-enlarged head portion 20 slidably arranged within collar portion 64. A Belleville spring stack, again indicated at 22, acts between the body and the piston head, and urges the seat member to move downwardly relative to the body until such time as the seat member abuts a stop 23 in collar portion 64. The seat member is shown as having a stepped vertical through-bore which terminates, at its upper end, in a sharpened annular seat 24 in the common portion between the various passages.

A valve member, generally indicated at 68, has a lower narrowed tubular portion 69 mounted for sealed sliding movement within the upper portion of the body through-bore, and has an uppermost head portion 70 mounted for sealed sliding movement within a chamber defined by body parts 62, 63. The piston subdivides this chamber into a lower chamber 71 which is vented to ambient pressure, and an upper chamber 12. A sensing passageway 73 communicates the large-diameter portion of outlet passage 65 with the body upper through-bore portion beneath valve member portion 69.

As best shown in FIG. 4, the lower marginal end portion of the valve member is radially relieved to provide an outwardly-facing vertical cylindrical surface 74 that extends upwardly for a portion of the length of narrowed portion 75. This surface defines with the facing surface 76 of the body bore, an open-ended annular passage 78 that extends upwardly into the body from the common intersection between the various passages. While, in the preferred embodiment, the body member tubular portion 69 is shown as being radially relieved relative to the body through-bore, in an alternative arrangement (not shown), the body through-bore might be relieved relative to the valve member to provide this annular space. The valve member is also shown as having a vertical through-bore 79, and a lowermost cushion 80. An annular or ring-like projection 81 extends radially outwardly from the valve member portion 76 so as to have its outer margin be arranged in closely-spaced facing relation to the inwardly-facing bore wall 76.

In the preferred embodiment, bore wall 76 has a diameter of about 0.282 inches [0.716 cm], valve member surface 74 has a diameter of about 0.222 inches [0.660 cm], and annular projection 81 has an outer diameter of about 0.280 inches [0.711 cm]. Hence, the radial clearance is about 0.001 inches [0.00254 cm]. Thus, the annular orifice defined between projection 81 and body surface 76 is less than about 10%, and may only be about 9.4%, of the annular area between facing surfaces 74, 76. However, while this dimensional relationship is preferred in the disclosed embodiment, it should not be regarded as being limitative of the scope of the appended claims unless an express limitation to this effect appears therein. Indeed, this dimensional relationship may be readily changed or varied, as desired, so long as the end result is maintained. The closeness of the spacing between projection 81 and the bore wall provides a type of secondary restriction or orifice that inhibits the outlet pressure above the seat from immediately equalizing with the pressure in chamber 72 because of the annular orifice. Rather, fluid is constrained to flow upwardly from the inlet through the uncovered main valve, and then leftwardly through the outlet. As it passes through the outlet passage 65, the fluid goes from the diametrically-reduced portion 82 thereof to the diametrically-enlarged portion 83 thereof. The lower end of sensing passage 73 communicates with this large-diameter passage portion 83. Thus, the normal L-shaped flow of fluid passing from the inlet to the outlet, acts as an eductor with respect to sensing conduit 73, and aspirates fluid in upper control chamber 72 into the flow through the regulator through the communicating valve member passageway 79 and sensing passage 73.

Thus, in this manner, the action of the valve member becomes more responsive to the demand conditions at the outlet. In other words, when fluid is demanded at the outlet, the pressure in outlet passage 65 fails. This reduces the pressure in sensing passage 73, in valve member passage 79, and in chamber 72. Hence, the valve member moves upwardly through expansion of spring 84. As this happens, fluid flows from the inlet to the outlet. However, such flow through outlet conduit portions 82 and 83 aspirates fluid from chamber 72, and entrains such aspirated fluid in the outlet flow. Thus, the responsiveness of the valve member to a demand flow condition is substantially enhanced because the aspiration feature serves to reduce the time delay of the valve member movement in response to changes in demand pressure.

By the same token, when the demand ceases, the pressure in outlet passageway 65 will increase. This will be transmitted through sensing passage 73 and valve member through-bore 79 to chamber 72, which, in turn, urges the valve member to move downwardly toward the seat to modulate such flow.

FIG. 5 comparatively illustrates the results of the improved regulator with respect to the prior art. As shown in FIG. 5, the salient feature is that the improved device functions to better maintain the outlet pressure at increased flows than in either prior art device.

Therefore, the present invention broadly provides an improved pressure regulator which broadly includes a body provided with a bore. A seat member (either stationary or movable) forms a seat at an intermediate portion of the bore. The seat subdivides the bore into an entrance passage and a guide passage. The entrance passage communicates with an inlet, and is adapted to receive fluid from a suitable source. The body is provided with at least one exit passage which communicates with the end of the guide passage that is arranged adjacent the seat, with an outlet. This exit passage may extend normally away from the body through-bore, although this arrangement may be changed as desired. The improved regulator also includes a valve member mounted in the guide passage for controlled movement toward and away from the seat to selectively vary the area of a main orifice through which fluid is adapted to flow from the inlet to the outlet. The valve member has an outwardly-facing surface arranged in spaced relation to an inwardly-facing surface of the guide passage. The body also has a sensing passage communicating the guide passage with the exit passage. The guide passage and the valve member facing surfaces are so dimensioned and configured as to provide an elongated open-ended annular space therebetween that extends along the guide passage from its communicative intersection with the exit passage to a point beyond the place at which the sensing passage communicates with the guide passage. A projection extends from one of these facing surfaces toward the other at a location between the open end of the guide passage and the sensing passage to provide a flow restriction. The magnitude of the outlet pressure at increased fluid flows from the inlet to the outlet is better maintained.

The data plotted in FIG. 5 for the improved regulator is summarized in the following table:

TABLE 3

| Improved Regulator (FIG. 3) | | | |
|---|---|---|---|
| Without Projection (0.030" Clearance) | | With Projection (0.001" Clearance) | |
| Pressure | Flow | Pressure | Flow |
| 140 PSIG [9.65 BAR] | 0 SCFM [0.00 m³/min] | 140 PSIG [9.65 BAR] | 0 SCFM [0.00 m³/min] |
| 134 PSIG [9.24 BAR] | 5 SCFM [0.14 m³/min] | 137 PSIG [9.45 BAR] | 5 SCFM [0.14 m³/min] |
| 133 PSIG [9.17 BAR] | 10 SCFM [0.28 m³/min] | 137 PSIG [9.45 BAR] | 10 SCFM [0.28 m³/min] |
| 132 PSIG [9.10 BAR] | 15 SCFM [0.42 m³/min] | 135 PSIG [9.31 BAR] | 15 SCFM [0.42 m³/min] |
| 132 PSIG [9.10 BAR] | 20 SCFM [0.57 m³/min] | 133 PSIG [9.17 BAR] | 20 SCFM [0.57 m³/min] |
| 127 PSIG [8.76 BAR] | 25 SCFM [0.71 m³/min] | 132 PSIG [9.10 BAR] | 25 SCFM [0.71 m³/min] |
| 125 PSIG [8.62 BAR] | 30 SCFM [0.85 m³/min] | 133 PSIG [9.17 BAR] | 30 SCFM [0.85 m³/min] |

Modifications

The present invention contemplates that many changes and modification may be made. For example, the body may be formed integrally or in multiple pieces, subsequently assembled, as desired. The various shapes and configurations of these pieces may be changes or modified, as desired. Similarly, while the improved valve is shown as having a movable seat member, particularly to allow the valve to be refilled through the outlet port, in some forms, the seat may be stationary. The valve member may assume various forms. With respect to the annular space, either or both of the valve member and body bore surfaces may be appropriately relieved to provide the clearance. The projection, which if preferably annular, need not necessarily be so, but may be circumferentially-spaced, or may exist in only one piece, as desired.

Therefore, while the presently preferred form of the improved pressure regulator has been shown and described, and several modifications thereof discussed, persons skilled in this art will readily appreciate that various additional changes and modifications may be made without departing from the spirit of the invention, as defined and differentiated by the following claims.

What is claimed is:

1. A pressure regulator, comprising:

a body provided with a bore;

seat means forming a seat at an intermediate portion of said bore, said seat subdividing said bore into an entrance passage and a guide passage, said entrance passage communicating with an inlet;

said body being provided with an exit passage communicating the end of said guide passage that is arranged adjacent said seat with an outlet;

a valve member mounted in said guide passage for controlled movement toward and away from said seat to selectively vary the area of a main orifice through which fluid is adapted to flow from said inlet to said outlet, said valve member having an outwardly-facing surface arranged in spaced relation to an inwardly-facing surface of said guide passage;

said body also having a sensing passage communicating said guide passage with said exit passage;

said guide passage and valve member facing surfaces being so dimensioned and configured as to provide an elongated open-ended annular space therebetween that extends along said guide passage from its communicative intersection with said exit passage to a point beyond the place at which said sensing passage communicates with said guide passage; and an annular projection extending from one of said acing surfaces toward the other of said facing surfaces at a location between the open end of said guide passage and said sensing passage to provide a flow restriction between said surfaces to fluid flow from said entrance passage toward said sensing passage;

whereby the magnitude of the outlet pressure at increased fluid flows from said inlet to said outlet will be substantially maintained.

2. A pressure regulator as set forth in claim 1 and further comprising a seat member movably mounted in said entrance passage, and wherein said seat is provided on said seat member.

3. A pressure regulator as set forth in claim 1 wherein said bore is linear.

4. A pressure regulator as set forth in claim 3 wherein said exit passage extends normally away form said bore.

5. A pressure regulator as set forth in claim 1 wherein said sensing passage communicates with a portion of said outlet passage intermediate its longitudinal extent.

6. A pressure regulator as set forth in claim 1 wherein said outlet passage has a small-diameter portion and a large-diameter portion adjacent said outlet, and wherein said sensing passage communicates with said large-diameter portion.

7. A pressure regulator as set forth in claim 1 wherein said valve member has a piston head slidably mounted on said body and having a face exposed to the pressure in a chamber, and wherein said valve member has a passage communicating said chamber with said space.

8. A pressure regulator as set forth in claim 7 wherein said sensing passage is configured to act as an eductor.

9. A pressure regulator as set forth in claim 1 wherein said projection is annular.

10. A pressure regulator as set forth in claim 1 wherein the radial clearance between said projection and said other facing surface is about 0.001 inches.

11. A pressure regulator as set forth in claim 1 wherein the area of the orifice defined between said projection and said other facing surface is less than about 10% of the projected area between said facing surfaces.

* * * * *